United States Patent [19]

Wolf

[11] 4,141,527
[45] Feb. 27, 1979

[54] VIBRATION DAMPER

[76] Inventor: Hans Wolf, Köslinstr. 49, 3300 Braunschweig, Fed. Rep. of Germany

[21] Appl. No.: 800,406

[22] Filed: May 25, 1977

[30] Foreign Application Priority Data

May 28, 1976 [DE] Fed. Rep. of Germany ....... 2623819

[51] Int. Cl.² ............................................. F16F 13/04
[52] U.S. Cl. .................................................... 248/562
[58] Field of Search .......... 248/8, 24, 358 R, 358 AA

[56] References Cited

U.S. PATENT DOCUMENTS

| | | | |
|---|---|---|---|
| 991,185 | 5/1911 | Weeks et al. | 248/358 AA X |
| 1,506,557 | 8/1924 | Bird | 248/358 AA |
| 1,543,769 | 6/1925 | Hewlett et al. | 248/358 AA |
| 1,703,297 | 2/1929 | Chase | 248/358 R X |
| 2,021,370 | 11/1935 | Mallay | 248/358 R X |
| 2,642,252 | 6/1953 | Pietz | 248/24 X |
| 2,660,386 | 11/1953 | Munro | 248/358 R X |
| 2,680,585 | 6/1954 | Crede | 248/24 X |
| 3,128,071 | 4/1964 | Frazer-Nash | 248/358 R X |
| 3,963,205 | 6/1976 | Hageman | 248/55 |

FOREIGN PATENT DOCUMENTS 540954  5/1957  Canada .............................. 248/358 AA

*Primary Examiner*—William H. Schultz
*Attorney, Agent, or Firm*—Salter & Michaelson

[57] ABSTRACT

A vibration damper of the type including a supporting flange, a pair of damping elements applied, respectively, against an upper and a lower face of the supporting flange, a mounting flange supported on the upper damping element and an abutment which is applied against the lower face of the lower damping element. The mounting flange has a central part extending through the damping elements and the supporting flange and connecting the mounting flange to the abutment. The connecting part is fixed both rotationaly and axially to the mounting flange and is connected to the abutment by a screw-thread. The abutment is secured against rotation relatively to the supporting flange and is preferably located with respect to the supporting flange to permit axial movement of the abutment relatively to the supporting flange.

13 Claims, 1 Drawing Figure

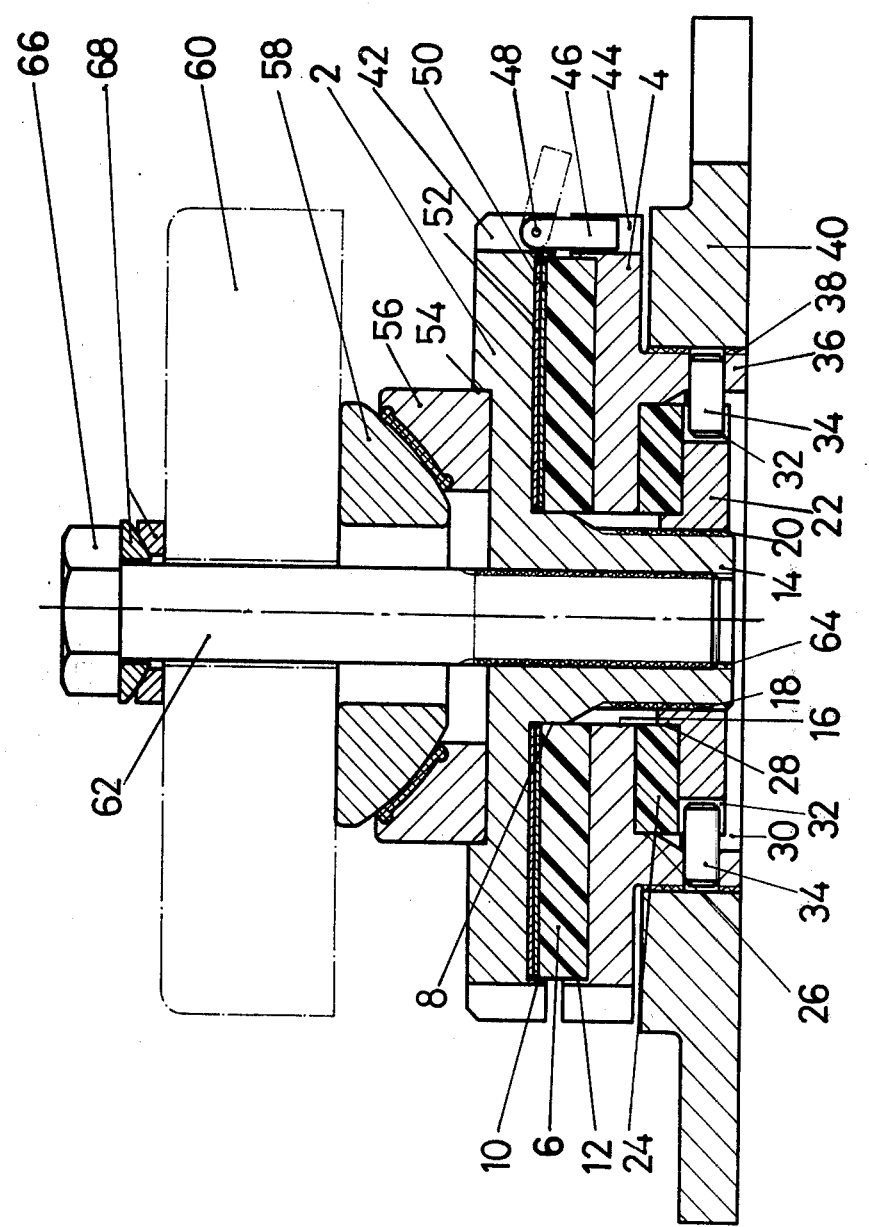

VIBRATION DAMPER

The invention relates to a vibration damper of the kind including a supporting flange having a damping element applied to each of its upper and its lower faces, a mounting flange which rests on the upper damping element and an abutment which is applied against the lower face of the lower damping element, the mounting flange having a central part extending through the damping elements and the supporting flange and connecting the mounting flange to the abutment.

In known vibration dampers of this type the upper damping element is usually in compression and the lower damping element is usually in tension, the amount of the pre-stressing according to the static load. It cannot be expected, even with very flat characteristic curves of the damping elements, that the damping elements will function optimally over the whole range of loading which, in commercial usage, ranges in order of magnitude from 1 to 20 and more. This applies particularly where the machine to be mounted with minimum vibration is subjected to variable static load at its point of support and in addition is loaded with variable dynamic pressures.

An object of the invention is to produce a vibration damper of the kind described above which can be optimally adapted to static loads and dynamic pressures acting on any mounting point of a machine supported by the vibration damper.

This object is achieved according to the invention in that the connecting part is fixed both rotationally and axially to the mounting flange and is connected to the abutment by a screw-thread and the abutment is secured against rotation relatively to the supporting flange.

In the design of the vibration damper according to the invention, pre-stressing of the damping element no longer depends exclusively on the static load at the point of support of the machine. On the contrary, it is possible to set pre-stresses which are greater than the pre-stress determined by the static load. In addition, it is possible, even when the lower damping element is in tension, to pre-stress the pressure-loaded damping element in proportion to the pre-stress and in this way to optimise the damping behaviour of the vibration damper in the direction of the tensile force as well. Further, it is additionally possible by means of the vibration damper according to the invention to reduce amplitudes resulting from dynamic interaction, particularly for machines operating in the over-damping region during starting-up or running down.

The abutment is preferably located with respect to the supporting flange to permit axial movement of the abutment relatively to the supporting flange.

A releasable arresting member is preferably provided between the mounting flange and the support flange by which the two flanges are maintained in the mutal position which corresponds to the pre-stress at any instant.

The mounting flange and/or the supporting flange may conveniently be designed to be substantially cylindrical at its circumference and be provided with recesses for engagement by a hook spanner. The mounting flange and/or the supporting flange may have grooves in the substantially cylindrical circumference extending parallel to the axis for this purpose. In a design having grooves parallel to the axis an arresting spring may be provided on the mounting flange or on the supporting flange, the spring being arranged to be swivelled into and out of engagement with a groove on the other flange.

The ease of adjustment of the vibration damper according to the invention to the conditions prevailing at any time may be improved by connecting the supporting flange to a base by a screw-thread by which the supporting flange is adjustable in height. The screw-threaded connection may be formed on an annular extension of the supporting flange in which the lower damping element and the abutment are positioned. In this case, in a convenient form of embodiment, the abutment has at least one slot parallel to the axis in its circumference and a radial projection engages with the or each slot and with the annular extension of the supporting flange. The height adjustment of the vibration damper according to the invention by means of a threaded connection between the supporting flange and the base makes it possible to use a thread of larger diameter so that low contact pressures are produced in the thread, whereby even with relatively high loads, levelling of the machine support in question is possible with relatively low energy. At the same time strong staying and broad support of the mounting point of the machine on the mounting flange is possible. Levelling a machine by means of a carrying bolt which is screwed into a supporting nut lying on the bed-plate of the machine is known from German Patent Specification No. 23 04 132. This levelling device operates with a necked-down bolt as attachment- and vibration damping-element. In addition it is known to provide for levelling a bell overlapping the vibration damper which is adjustable up and down on the attachment screw. In that design the transmission of force occurs exclusively through the exposed end of the attachment screw underneath the bell.

The damping elements in the vibration damper of the present invention are preferably designed as plane gaskets. These damping elements in the form of gaskets are preferably centred and radially clamped on the respective flanges by means of circular collars.

In order to reduce friction between the damping elements and the bearing faces of the flanges and thus to keep the energy consumption needed for establishment of the pre-stress low, at least one low friction plate or at least one plate provided with a low friction coating on at least one side may be provided between the damping element and the surface of the flange.

In order to bring about uniform load transmission from the mounting surface of the machine or from the machine foot to the damping element a pair of gaskets with contact faces in the form of spherical segments is preferably provided on the upper face of the mounting flange.

An embodiment of vibration damper according to the invention is illustrated as an example of the accompanying drawing which is a cross-section through the vibration damper and is now described wth reference to the drawing.

The vibration damper includes a mounting flange 2 and a supporting flange 4. A damping element 6 lies between these two flanges. The damping element 6 lies in an annular recess provided in the lower surface of the mounting flange 2 with an inner peripheral surface 8 and an outer peripheral surface 10. The outer surface 10 is formed by the internal boundary of a circular collar on the lower face of the mounting flange 2. In the upper face of the supporting flange 4 there is an annular groove which forms one outer peripheral surface 12 on the upper face of the supporting flange corresponding to the outer surface 10 of the mounting flange 2. The surface 12 is also formed by the inner peripheral face of a circular collar. The mounting flange 2 has a central tubular part 14 extending downwards and passing through a central opening 16 in the supporting flange 4. The part 14 is provided with an external thread 18 by means of which it is screwed into a threaded bore 20 in an abutment 22. Between the upper face of the abutment 22 and the lower face of the supporting flange 4 there is a damping element 24 in the form of a gasket which is applied at its outer periphery against a cylindrical wall 26 downwardly extending from the supporting flange 4. The inner periphery of the damping element 24 is centered by means of a cylindrical wall 28 of a recess in the upper face of the abutment 22. The abutment 22 lies in a recess 30 in the lower face of the supporting flange 4 and is axially movable but fixed against rotation. Slots 32 parallel to the axis of the abutment 22 are provided in the circumference of the abutment 22 at two diametrically opposite points. Pins 34 arranged in radial bores in the supporting flange 4 extend into the slots 32 to hold the abutment 22 from rotation while permitting its axial movement. The recess 30 in the lower face of the supporting flange 4 is formed by an annular extension 36 which has a thread 38 on its outer circumference by which the supporting flange 4 is screwed into a base flange 40.

By rotating the mounting flange 2 relatively to the supporting flange 4 the axial position of the abutment 22 is adjusted. Thus the pre-stress on the damping elements 6 and 24 is adjustable independently of the static load which is transmitted to the damping elements from a machine supported by the vibration damper. To simplify this adjustment, the mounting flange 2 and the supporting flange 4 have recesses on their circumferences for the attachment of a hook spanner. In the example illustrated, grooves 42 and 44 parallel to the axis are arranged, for this purpose, on the circumference of the mounting flange 2 and of the supporting flange 4, respectively.

After the desired or the necessary pre-stress has been set the two flanges 2 and 4 are locked to one another. In the embodiment illustrated, an arresting spring 46 is provided for this purpose. The spring 46 is able to swivel about an axis 48 in one of the grooves 42 parallel to the axis of the mounting flange 2. This arresting spring can be swivelled into one of the grooves 44 on the supporting flange 4, as shown in full lines in the drawing. To unlock the flanges 2 and 4, the spring is swivelled into the position shown in dot-dash lines. In order to hold the spring in this position a suitable arrest is provided, for example, a spring-loaded lock ball or like device.

With an arresting device of the type illustrated in the drawing, changes in the pre-stress of the damping elements 24 and 6 are produced in steps determined by the spacing of the grooves 44. However it is possible without difficulty to achieve a small step separation. For example, where the thread 20 has a fine thread having a pitch of 1 mm it is possible with ten grooves 44 on the supporting flange 4 to adjust, in each case, to a pre-stressing displacement of 1/10 mm.

The grooves 44 on the supporting flange 4 serve at the same time for the engagement of a hook spanner for levelling, when the height of the supporting ring 4 is adjusted by means of the thread 38.

When changing the pre-stressing by rotating the mounting flange 2 relatively to the supporting flange 4 large frictional forces may arise between the damping elements and the bearing surfaces of the flanges 2 and 4 against which they are applied. In order to make relative movement easier plates of a material having lower coefficient of friction or with a surface coating having a low coefficient of friction may be provided between at least one of the bearing surfaces and the damping elements. In this embodiment, two plates 50, 52 are provided. These plates may, for example, be gaskets of synthetic material or also metal gaskets provided with a coating of a material having a low coefficient of friction, for example polytetrafluoroethylene. It is, for example, possible to coat the adjacent surfaces of the two gaskets 50, 52. The arrangement of two plates has the advantage that the bearing surface of the supporting flange 2 which faces towards the damping element 6 does not require to be additionally worked so as to produce a low friction.

A depression 54 is provided in the upper face of the mounting flange 2 in which the lower ring 56 of a swingbearing is, the upper ring 58 of the swing bearing forming the support for the foot 60 of the machine to be supported. The bearing surface between the two rings 56 and 58 is coated with a bearing material. However, two substantially flat gaskets with a spherical segment may alternatively be provided to from the contact surfaces. Attachment of the machine foot 60 on the vibration damper is performed by a screw 62 which can be screwed into a thread 64 in the tubular connecting part 14. The head 66 of the screw is supported on the upper face of the foot 60 of the machine by a pair of gaskets 68 each having a spherical segment as a bearing surface. Even with tilted seating, a pure tension loading in the screw 62 is achieved by means of the pair of gaskets 68.

After the vibration damper has been mounted beneath the foot or support of a machine to be mounted in bearings with vibration damping, the damping elements 6 and 24 are first set to a medium pre-stress which is adjustable, for example by means of a torque wrench, when the gaskets 50 and 52 are used with the resulting reduced friction therebetween. The machine is then levelled by turning the supporting flange 4 relatively to the base flange 40. During operation any machine support can be accommodated optimally by changing the pre-stress of the damping elements. As a change in the pre-stress leads to a change in level, the level must be adjusted after changing the pre-stress. This may take place without fresh calibration of the machine if the same pitch is provided for the threads 20 and 38. where during alteration of the pre-stress, the mounting ring 2 is, for example, turned clockwise through four divisions relative to the supporting ring 4, it is sufficient to turn the supporting ring 4, it is sufficient to turn the supporting ring 4 through the same number of divisions in the opposite direction relatively to the base flange 40 in order to reproduce the original level.

The damping elements 6 and 24 may, for example, be cushions of steel spring wire, in particular stainless steel spring wire, or, as shown in the drawing, the damping elements may be constructed of synthetic material, for example "Vulkollan". The damping elements may, also be designed in the form of plane gaskets. It is however also possible, for example, to design the damping elements, in known manner, as more or less conical or to give them any form adapted to the design of the vibration damper employed.

What I claim as my invention and desire to secure by Letters Patent of the United States is:

1. A vibration damper including a base flange having a threaded bore, a supporting flange having a generally central opening, said supporting flange threadably engaged with said base flange bore wherein portions of said supporting flange are upwardly spaced over said base flange and whereby said supporting flange is axially adjustable with respect to said base flange, an upper and a lower damping element each having a central opening respectively engaging an upper and a lower face of said supporting flange, a mounting flange supported on top of said upper element, said mounting flange having a downwardly extending central part positioned through said openings in said elements and siad supporting flange, an abutment having an upper surface positioned against the lower face of said lower element, said central part of said mounting flange threadably connected to said abutment, and means between said abutment and said supporting flange for permitting relative axial movement therebetween but preventing relative rotational movement therebetween.

2. A vibration damper according to claim 1, in which a releasable arresting member is provided between the mounting flange and the supporting flange.

3. A vibration damper according to claim 1 in which at least one of the mounting flange and the supporting flange is designed to be substantially cylindrical at its circumference and is provided with recesses for engagement by a hook spanner.

4. A vibration damper according to claim 3, in which the recesses are grooves in the substantially cylindrical circumference and extending parallel to the axis of the relevant flange.

5. A vibration damper according to claim 2 in which the arresting member is an arresting spring and is provided on one of the mounting flange and the supporting flange and which is capable of swivelling into and out of engagement with a groove on the other of said flanges, said groove being one of a plurality of grooves in a substantially cylindrical surface of said other flange and extending parallel to the axis thereof.

6. A vibration damper according to claim 1 in which the screw-threads of the abutment and the supporting flange have the same pitch.

7. A vibration damper according to claim 1 in which the screw-threaded connection is formed on an annular extension of the supporting flange in which the lower damping element and the abutment are positioned.

8. A vibration damper according to claim 7 in which the abutment has at least one slot in its circumference and parallel to its axis and a pin engages radially with the slot and with the annular extension of the supporting flange.

9. A vibration damper according to claim 1 in which the damping elements are in the form of plane gaskets.

10. A vibration damper according to claim 9 in which each of the damping elements is centred and radially clamped by means of a circular collar on the relevant flange.

11. A vibration damper according to claim 1 in which there is provided between a damping element and at least one of the adjacent flange faces at least one gasket having at least one low friction surface.

12. A vibration damper according to claim 11 in which two gaskets lying one on the other are provided and at least one of the gaskets has a low friction face adjacent the other gasket.

13. A vibration damper according to claim 1 in which a pair of gaskets each having a contact face of spherical shape is provided on the upper face of the mounting flange.

* * * * *